July 28, 1936.    M. A. SMITH, JR    2,049,330
TRANSMISSION DYNAMOMETER
Filed Oct. 27, 1931     2 Sheets—Sheet 1
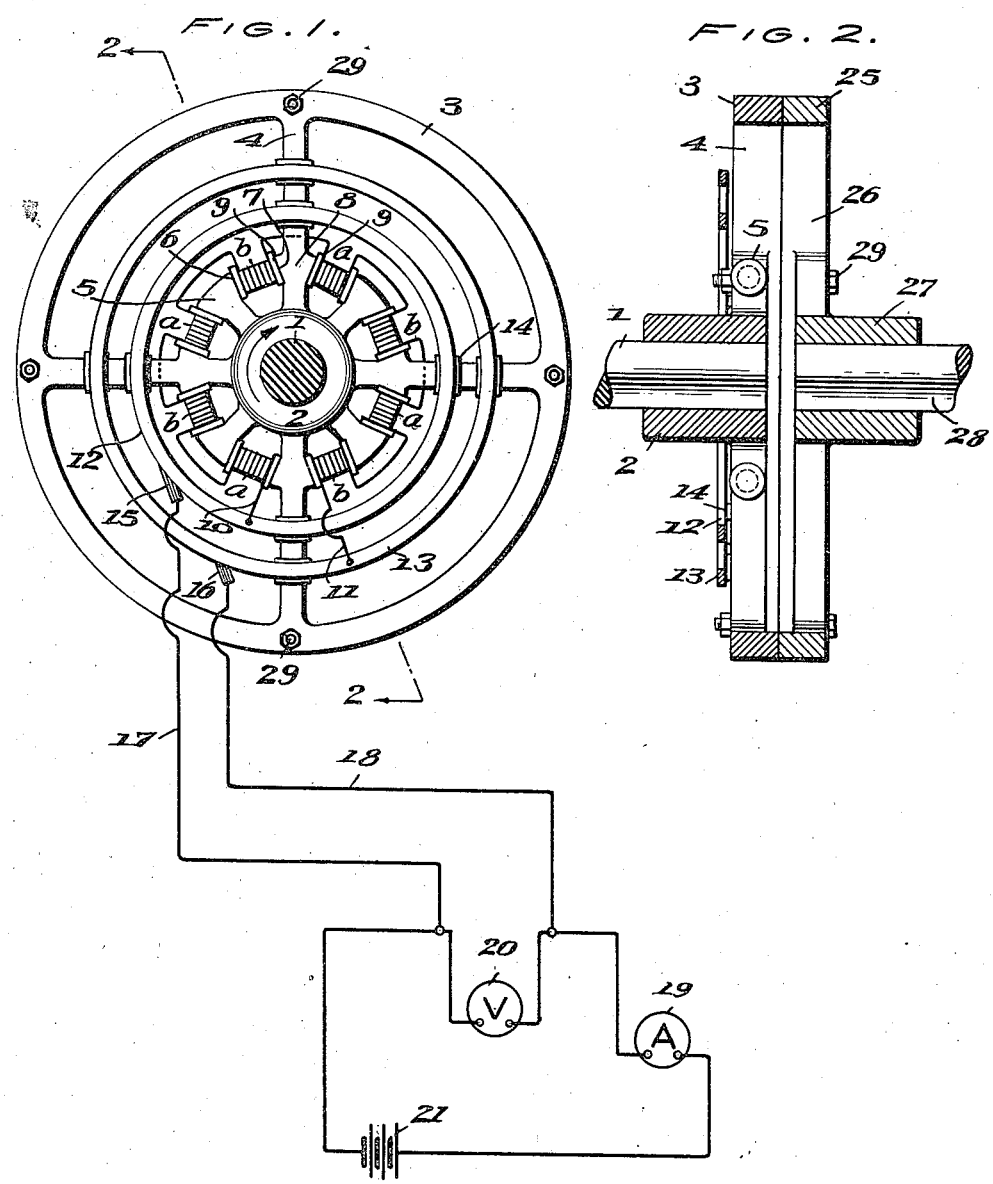
INVENTOR
MARSHALL A. SMITH, JR.
BY Robert H. Young
ATTORNEY July 28, 1936.   M. A. SMITH, JR   2,049,330
TRANSMISSION DYNAMOMETER
Filed Oct. 27, 1931   2 Sheets-Sheet 2
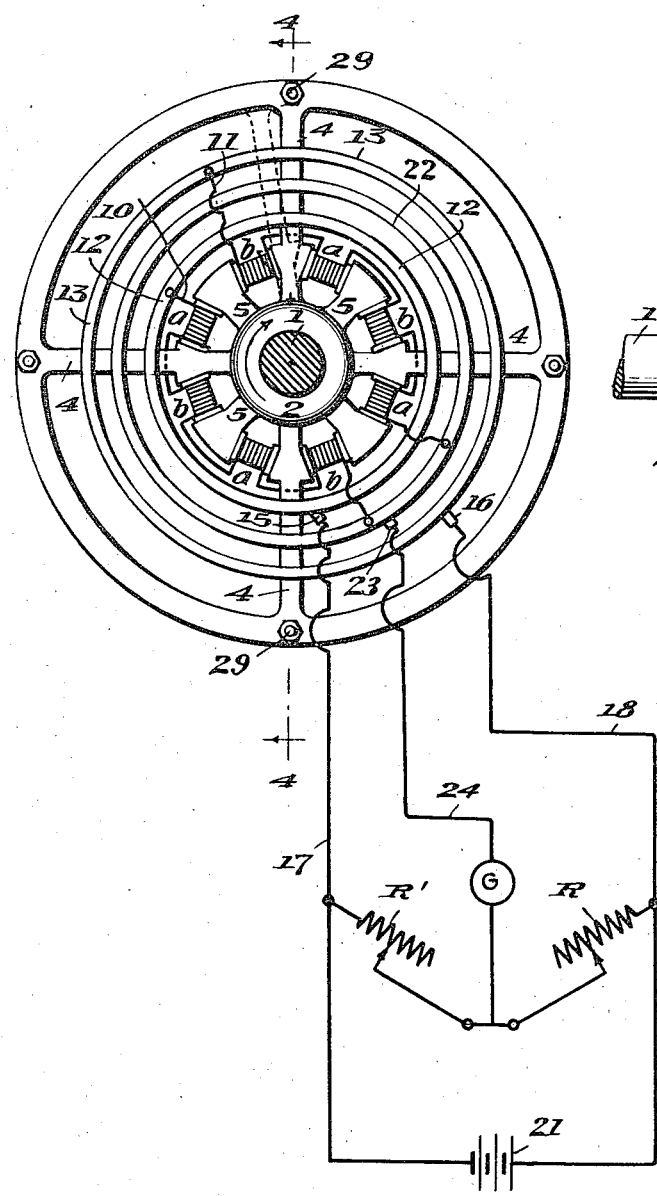
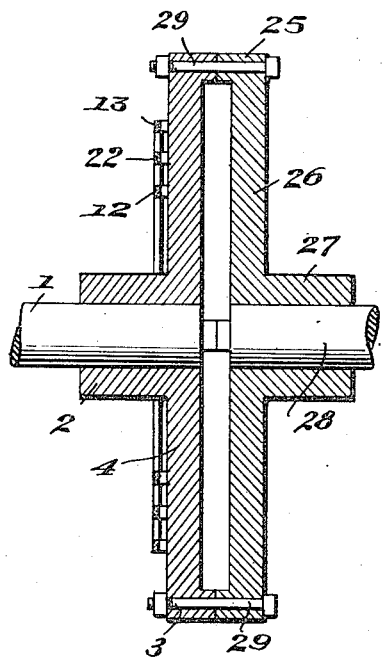
INVENTOR
MARSHALL A. SMITH, JR.
BY Robert H. Young
ATTORNEY Patented July 28, 1936

2,049,330

UNITED STATES PATENT OFFICE 2,049,330

TRANSMISSION DYNAMOMETER

Marshall A. Smith, Jr., South Bend, Ind.

Application October 27, 1931, Serial No. 571,431

5 Claims. (Cl. 177—351)

This invention relates to dynamometers and the object of the same is to provide an improved transmission dynamometer of the deflection type wherein the power transmitted is measured by the deflection of elements of the driving member.

A further object of the invention is to provide a transmission dynamometer of the deflection type embodying novel features of improvement over the transmission dynamometer disclosed in my co-pending application, Serial No. 529,490, filed April 11, 1931. (Patent No. 2,007,505, issued July 9, 1935.)

With the above in view, the invention consists in the novel arrangement, construction, and association of parts hereinafter more fully described and explained, with reference to the accompanying drawings, wherein:

Figure 1 is a diagrammatic view of a transmission dynamometer illustrating one application of the invention;

Figure 2 is a cross section taken on line 2—2 of Figure 1.

Figure 3 is a diagrammatic view of a dynamometer embodying a modification of the invention, and—

Figure 4 is a cross section on line 4—4 of Figure 3.

This transmission dynamometer consists of a driving member and a driven member. The driving member including a driving shaft 1 to which is keyed or otherwise rigidly fastened the hub portion 2 of the driving wheel, which hub portion is connected to the rim 3 of the wheel by spokes 4. The spokes 4 are machined integral with the hub portion 2 and with the rim 3. Between each pair of spokes 4 is located a short spoke or stub arm 5. These stub arms 5 are also machined integral with the hub portion and have faces 6 parallel to the faces 7 of bosses 8 on the spokes 4. Carbon piles or other electrical resistance units, the resistances of which are functions of the length or pressure on them are secured between the faces 6 and 7 and are insulated therefrom by insulating members 9. These resistance units, indicated at "$a$" and "$b$", may be arranged in such a manner as to be put under initial compression by adjusting screws.

In Fig. 1, the resistance units are shown connected in series, the terminals 10 and 11 of the end units being connected with slip rings 12 and 13 which are insulated from the spokes 4 by the insulating blocks 14. The slip rings 12 and 13 are connected through brushes 15 and 16 and leads 17 and 18 to any set of instruments, such as an ammeter 19 and a voltmeter 20, appropriate for measuring the resistance of the resistance units "$a$" and "$b$". The battery 21 supplies the electrical current necessary for the measurement of the resistance units.

While a series connection of the resistance units may be used, as shown in Fig. 1, any series—parallel, parallel, or differential connection may also be used. An advantageous connection of the resistance units is shown in Fig. 3. In this connection, all the resistance units "$a$" on the leading sides of the spokes are connected in series, and all the resistance units "$b$" on the trailing sides of the spokes are connected in series. The two sets or groups of resistance units are then connected through slip rings 12, 13, and 22, brushes 15, 16 and 23, and leads 17, 18, and 24, to battery 21 and to two adjustable resistances $R_1$ and $R_2$ to form a Wheatstone bridge. Any unbalance in the resistance of the two sets of resistance units is then indicated by the deflection of the pointer needle of the galvanometer "G".

The driven member consists of a rim 25 connected by spokes or a solid flange 26 with a hub portion 27 which is rigidly fastened to the driven shaft 28. The rim 25 of the driven member is rigidly secured by bolts or other fasteners 29 to the rim 3 of the driving member, the spokes 4 of which being resiliently flexible are deflected when the device is transmitting power. The deflection of the spokes is a function of the load transmitted; therefore, the deflection of the spokes is measured by resistance elements.

In operation, when power is transmitted from the driving shaft through the dynamometer, the resisting torque of the driven shaft causes the spokes 4 of the driving member to tend to bend slightly as shown by the dotted line structure of Fig. 3. This slight bend relieves slightly the mechanical pressure on the resistance units "$a$" on the leading sides of spokes 4 and increases slightly the mechanical pressure on the resistance units "$b$" on the trailing sides of the spokes. The value of the resistance offered by them decreases proportionately as they are compressed or shortened and increases proportionately as they are relieved of compression and permitted to expand. This decrease in pressure on one half of the resistance units and increase in pressure on the other half of the units causes an unbalance in the electrical currents flowing in the Wheatstone bridge, and the galvanometer needle is deflected.

The junction between the hub 2 and each spoke 4 may be considered as the pivot point about which the spoke bends when transmitting power and due to the bending movement of the spokes, the sum of the mechanical pressures on units "a" of one group will always be less than the sum of the mechanical pressures on units "b" of the other group. Therefore, the difference between the two resultant group pressures will have a net mechanical pressure in favor of units "b". The net electrical resistance will, however, be in favor of units "a" and this net electrical resistance will be in proportion to torque. Since the electrical resistance of the units is a function of the pressure acting upon them, and since the electric current which flows in the galvanometer of the Wheatstone bridge is a function of the difference in the electrical resistance of the two sets of resistance units, then the deflection of the galvanometer needle will be a function of the force acting upon the resistance units, and consequently of the torque transmitted through the dynamometer.

It is obvious that if a series of readings is taken from the galvanometer corresponding to known torques that this device can be used to indicate the torque transmitted through the dynamometer at any time. From the torque force and the revolutions per minute, the power transmitted may be computed.

Having thus described the invention, what I claim is:

1. A transmission dynamometer having, in combination, a driven member, a driving member having a plurality of radial spokes, alternate spokes being coupled with the driven member and being resiliently flexible to be deflected by the resisting torque of the driven member when power is transmitted from the driving member, the remaining spokes being non-flexible, electrical resistor elements the resistance of which varies with pressure confined between the said radial spokes so that each resistance element is located between a spoke which may flex and one which will not, said units electrically connected to provide two separate resistance groups, the resistance of one group of which is increased and the other decreased by the deflection, and means for indicating any unbalance in the resistance of the two groups.

2. A transmission dynamometer comprising a driving member, a driven member, rigid elements on the driving member, deflectable elements coupling the said driving and driven members and tending to bend relative to the rigid elements in response to the resisting torque of the driven member when power is transmitted from the driving member, and means for transmitting and indicating torque including pressure responsive resistor means between and operated by the relative movement of the said rigid and deflectable elements.

3. A transmission dynamometer having, in combination, a driving shaft, a driven shaft, driving and driven members fixed on the said driving and driven shafts respectively and having rigidly coupled rims, the said driving member having its rim connected with a hub portion by deflectable spokes tending to bend in repsonse to the resisting torque of the driven member when power is transmitted from the driving member, rigid stub arms integral with the said hub portion and projecting radially thereof and between the said deflectable spokes, said spokes and stub arms having confronting parallel faces, and electrical means for transmitting and indicating torque including pressure-responsive resistances secured between confronting faces of the said spokes and stub arms.

4. A transmission dynamometer having, in combination, a driving shaft, a driven shaft, driving and driven members fixed on said driving and driven shafts respectively, means for transmitting the motion of the driving member to the driven member, said driving member consisting of a hub having rigid stub arms integral therewith and projecting radially therefrom and a rim connected with the hub by deflectable spokes secured to the hub between the stub arms and tending to bend relative to the stub arms in response to the resisting torque of the driven member when power is transmitted from the driving member, and means for measuring the deflection of the spokes including an elastic element positioned between a rigid stub arm and a deflectable spoke so as to be elongated or compressed in direct proportion to the amount and direction of the occurring bending of the said spoke.

5. In a transmission dynamometer for determining the torque force between a driving member and a driven member, a torque wheel consisting of a rim adapted to be coupled with one of the members, a hub adapted to be coupled to the other member and having a short rigid spoke and an elongated flexible spoke, said flexible spoke being connected with the rim and being deflected from its normal position relative to the rigid spoke by the resisting torque of the driven member when the power of the driving member is transmitted thereto through the said wheel, an elastic element connecting the rigid spoke and the flexible spoke and being elongated or compressed in proportion to the direction and extent of deflection of the flexible spoke, and means controlled by said elastic element for indicating at a distance the amount of the elongation or compression of the elastic element.

MARSHALL A. SMITH, Jr.